(12) United States Patent
Gordon et al.

(10) Patent No.: US 12,521,244 B2
(45) Date of Patent: Jan. 13, 2026

(54) CRANIAL IMPLANT DEVICES, SYSTEMS, AND RELATED METHODS

(71) Applicant: THE JOHNS HOPKINS UNIVERSITY, Baltimore, MD (US)

(72) Inventors: Chad Gordon, Cockeysville, MD (US); Micah Belzberg, Baltimore, MD (US); Amir Manbachi, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 979 days.

(21) Appl. No.: 17/642,408

(22) PCT Filed: Sep. 11, 2020

(86) PCT No.: PCT/US2020/050358
§ 371 (c)(1),
(2) Date: Mar. 11, 2022

(87) PCT Pub. No.: WO2021/050843
PCT Pub. Date: Mar. 18, 2021

(65) Prior Publication Data
US 2022/0331112 A1    Oct. 20, 2022

Related U.S. Application Data

(60) Provisional application No. 62/899,962, filed on Sep. 13, 2019.

(51) Int. Cl.
*A61F 2/28*    (2006.01)
*A61B 5/00*    (2006.01)
(Continued)

(52) U.S. Cl.
CPC .......... *A61F 2/2875* (2013.01); *A61B 5/0095* (2013.01); *A61B 5/6864* (2013.01); *A61B 8/0808* (2013.01); *A61F 2/481* (2021.08)

(58) Field of Classification Search
CPC ...... A61F 2/2875; A61F 2/481; A61B 5/0095; A61B 5/6864; A61B 8/0808
See application file for complete search history.

(56) References Cited

U.S. PATENT DOCUMENTS

| 10,080,662 B2 | 9/2018 | Gordon et al. |
| 11,311,384 B2 * | 4/2022 | Gordon ................. A61F 2/2875 |

(Continued)

FOREIGN PATENT DOCUMENTS

| WO | 2018064239 A1 | 4/2018 |
| WO | 2018076075 A1 | 5/2018 |

OTHER PUBLICATIONS

Zhilina, Y. (Ru Authorized Officer), International Search Report and Written Opinion issued Dec. 3, 2020 in corresponding International Application No. PCT/US2020/050358, 11 pages.

(Continued)

*Primary Examiner* — Dixomara Vargas
(74) *Attorney, Agent, or Firm* — Harrity & Harrity, LLP

(57) ABSTRACT

Provided herein are cranial implant devices that include at least one acoustic, optical, and/or photoacoustic lens element comprising one or more electromagnetically translucent, electromagnetically transparent, sonolucent, and/or acoustically active materials. The cranial implant devices are structured for subgaleal scalp implantation within, beneath, and/or over at least one cranial opening of a subject and typically includes a substantially anatomically-compatible shape. In addition, the cranial implant devices permit transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the cranial opening of the subject.

(Continued)

Other aspects are directed to various related systems and methods of obtaining diagnostic information from, and/or administering therapy to, a subject.

18 Claims, 7 Drawing Sheets

(51) Int. Cl.
    *A61B 8/08*      (2006.01)
    *A61F 2/48*      (2006.01)

(56) References Cited

U.S. PATENT DOCUMENTS

| | | | |
|---|---|---|---|
| 2005/0283203 A1* | 12/2005 | Flaherty | A61B 5/6864 |
| | | | 607/48 |
| 2008/0140149 A1* | 6/2008 | John | A61B 8/0808 |
| | | | 607/45 |
| 2012/0271204 A1 | 10/2012 | Peyman | |
| 2013/0204316 A1* | 8/2013 | Carpentier | A61B 8/56 |
| | | | 607/45 |
| 2014/0330123 A1 | 11/2014 | Manwaring et al. | |
| 2016/0263277 A1 | 9/2016 | Kim et al. | |
| 2017/0156596 A1* | 6/2017 | Aguilar-Mendoza | |
| | | | A61N 5/0622 |
| 2018/0055640 A1* | 3/2018 | Gordon | B33Y 50/00 |
| 2018/0286379 A1 | 10/2018 | Norris et al. | |
| 2018/0325672 A1* | 11/2018 | Gordon | A61B 17/8085 |
| 2018/0338835 A1 | 11/2018 | Gordon | |
| 2019/0030374 A1 | 1/2019 | Carpentier et al. | |
| 2019/0192298 A1* | 6/2019 | Gordon | A61B 17/688 |
| 2022/0183844 A1* | 6/2022 | Clawson | A61B 8/0808 |
| 2022/0296375 A1* | 9/2022 | Gordon | A61F 2/2875 |
| 2023/0010415 A1* | 1/2023 | Christopher | A61B 5/031 |
| 2023/0020551 A1* | 1/2023 | Christopher | A61B 8/4209 |
| 2024/0023923 A1* | 1/2024 | Clawson | A61B 8/488 |

OTHER PUBLICATIONS

Extended European Search Report for Application No. EP20864234. 8, mailed on Aug. 10, 2023, 21 pages.
Li C., et al., "Photoacoustic Tomography and Sensing in Biomedicine," Physics in Medicine and Biology, Oct. 2009, vol. 54(19), pp. R59-R97, XP020163684, ISSN: 0031-9155, DOI: 10.1088/0031-9155/54/19/R01.
Belzberg et al., Transcranioplasty Ultrasound Through a Sonolucent Cranial Implant Made of Polymethyl Methacrylate: Phantom Study Comparing Ultrasound, Computed Tomography, and Magnetic Resonance Imaging., Journal of Craniofacial Surgery., (2019), pp. 626-629, vol. 30(7).
Dujovny et al., Bone-like Polyethelyne Burr-hole Cover., Neurological Research., (2005), pp. 333-334, vol. 27.
Sinclair et al., Imaging of the Post-operative Cranium., Radiographics., (2010), pp. 461-482, vol. 30(2).
Vialogo., Autogenic bone plug to seal burr holes: technical note., Archives of Neuropsychiatry., (1999), pp. 1041-1045, vol. 57(4).
Ganti., Burr Hole Craniotomy., Atlas of Emergency Medicine Procedures., (2016), pp. 235-240, vol. 39.
Kashimura et al., A newly designed hydroxyapatite ceramic burr-hole button., Vascular Health and Risk Management., (2010), pp. 105-108, vol. 6.
Im et al., The Efficacy of Titanium Burr Hole Cover for Reconstruction of Skull Defect after Burr Hole Trephination of Chronic Subdural Hematoma., Korean Journal of Neurotrauma., (2014), pp. 76-81, vol. 10(2).
Vasella et al., Improving the aesthetic outcome with burr hole cover placement in chronic subdural hematoma evacuation—a retrospective pilot study., Acta Neurochirurgica., (2018), pp. 2129-2135, vol. 160.

Piazza et al., Cranioplasty., Neurosurgery Clinics., (2017), pp. 257-265, vol. 28(2).
Feroze et al., Evolution of cranioplasty techniques in neurosurgery: historical review, pediatric considerations, and current trends., Journal of Neurosurgery., (2015), pp. 1098-1107, vol. 123(4).
Reddy et al., Clinical outcomes in cranioplasty: risk factors and choice of reconstructive material., Plastic and Reconstructive Surgery., (2014), pp. 864-873, vol. 133(4).
Servadei et al., The therapeutic cranioplasty still needs an ideal material and surgical timing., World on Neurosurgery., (2015), pp. 133-135, vol. 83(2).
Gilardino et al., A comparison and cost analysis of cranioplasty techniques: autologous bone versus custom computer-generated implants., Journal of Craniofacial Surgery., (2015), pp. 113-117, vol. 26(1).
Artico et al., Bone autografting of the calvaria and craniofacial skeleton: historical background, surgical results in a series of 15 patients, and review of the literature., Surgical Neurology., (2003), pp. 71-79, vol. 60(1).
Pryor et al., Review of bone substitutes., Craniomaxillofac Trauma Reconstruction., (2009), pp. 151-160, vol. 2(3).
Malcolm et al., Autologous Cranioplasty is Associated with Increased Reoperation Rate: A Systematic Review and Meta-Analysis., World Neurosurgery., (2018), pp. 60-68, vol. 116.
Van De Vijfeijken et al., Autologous Bone Is Inferior to Alloplastic Cranioplasties: Safety of Autograft and Allograft Materials for Cranioplasties, a Systematic Review., World Neurosurgery., (2018), pp. 443-452, vol. 117.
Wolff et al., Adult Cranioplasty Reconstruction With Customized Cranial Implants: Preferred Technique, Timing, and Biomaterials., Journal of Craniofacial Surgery., (2018), pp. 887-894, vol. 29(4).
Zhong et al., Quantitative analysis of dual-purpose, patient-specific craniofacial implants for correction of temporal deformity., Neurosurgery., (2015), pp. 220-229, vol. 11(2).
Hersh et al., Emerging Applications of Therapeutic Ultrasound in Neuro-oncology: Moving Beyond Tumor Ablation., Neurosurgery., (2016), pp. 643-654, vol. 79(5).
Christian et al., Focused ultrasound: relevant history and prospects for the addition of mechanical energy to the neurosurgical armamentarium., World Neurosurgery., (2014), pp. 354-365, vol. 82(3-4).
Quadri et al., High-intensity focused ultrasound: past, present, and future in neurosurgery., Neurosurgical Focus., (2018), vol. 44(2):E16.
Weintraub et al., The emerging role of transcranial magnetic resonance imaging-guided focused ultrasound in functional neurosurgery., Movement Disorders., (2017), pp. 20-27, vol. 32(1).
Carpentier et al., Clinical trial of blood-brain barrier disruption by pulsed ultrasound., Science Translational Medicine., (2016), p. 343re2, vol. 8(343).
Gutierrez et al., Novel Cranial Implants of Yttria-Stabilized Zirconia as Acoustic Windows for Ultrasonic Brain Therapy., Adv Healthcare Materials., (2017), vol. 6(21):1700214.
Monteith et al., Potential intracranial applications of magnetic resonance-guided focused ultrasound surgery., Journal of Neurosurgery., (2013), pp. 215-221, vol. 118(2).
Vignon et al., The stripe artifact in transcranial ultrasound imaging., Journal of Ultrasound Medicine., (2010), pp. 1779-1786, vol. 29(12).
Pinton et al., Attenuation, scattering, and absorption of ultrasound in the skull bone., Medical Physics., (2011), pp. 299-307, vol. 39(1).
Orman et al., Neonatal head ultrasonography today: a powerful imaging tool!., Journal of Neuroimaging., (2015), pp. 31-55, vol. 25(1).
Van Wezel-Meijler et al., Cranial ultrasonography in neonates: role and limitations., Seminars in Perinatology., (2010), pp. 28-38, vol. 34(1).
Salas et al., Head Ultrasound in Neonatal Hypoxic-Ischemic Injury and Its Mimickers for Clinicians: A Review of the Patterns of Injury and the Evolution of Findings Over Time., Neonatology., (2018), pp. 185-197, vol. 114(3).
Berli et al., Immediate Single-Stage Cranioplasty Following Calvarial Resection for Benign and Malignant Skull Neoplasms Using Customized Craniofacial Implants., Journal of Craniofacial Surgery., (2015), pp. 1456-1462, vol. 26(5).

(56) References Cited

OTHER PUBLICATIONS

Carlson et al., Frequency and temperature dependence of acoustic properties of polymers used in pulse-echo systems., IEEE Symposium on Ultrasonics., (2003), pp. 885-888, vol. 1.

Zygourakis et al., Clinical utility and cost analysis of routine postoperative head CT in elective aneurysm clippings., Journal of Neurosurgery., (2017), pp. 558-563, vol. 126(2).

Gordon et al., Multidisciplinary approach for improved outcomes in secondary cranial reconstruction: introducing the pericranial-onlay cranioplasty technique., Operative Neurosurgery., (2014), pp. 179-190, vol. 10(2).

Fry et al., Acoustic properties of the human skull., Journal of the Acoustical Society of America., (1978), pp. 1576-1590, vol. 63(5).

Janus et al., Complications after oncologic scalp reconstruction: a 139-patient series and treatment algorithm., Laryngoscope., (2015), pp. 582-588, vol. 125(3).

Broughton et al., Seven years of cranioplasty in a regional neurosurgical centre., British Journal of Neurosurgery., (2014), pp. 34-39, vol. 28(1).

Wachter et al., Cranioplasty after decompressive hemicraniectomy: underestimated surgery-associated complications?., Clinical Neurology & Neurosurgery., (2013), pp. 1293-1297, vol. 115(8).

Mursch et al., Polyether Ether Ketone Cranioplasties Are Permeable to Diagnostic Ultrasound., World Neurosurgery., (2018), pp. 142-143, vol. 117.

Blakenberg et al., Sonography, CT, and MR Imaging: A Prospective Comparison of Neonates with Suspected Intracranial Ischemia and Hemorrhage., American Journal of Neuroradiology., (2000), pp. 213-218, vol. 21(1).

Bano et al., Neonatal Hypoxic-ischemic Encephalopathy: A Radiological Review., Journal of Pediatric Neurosciences., (2017), pp. 1-6, vol. 12(1).

\* cited by examiner

CRANIAL IMPLANT DEVICES, SYSTEMS, AND RELATED METHODS

CROSS REFERENCE TO RELATED APPLICATION

This application is a national stage entry from International Application No. PCT/US2020/050358, filed on Sep. 11, 2020, published as International Publication No. WO 2021/050843 A1 on Mar. 18, 2021, and claims the benefit of U.S. Provisional Patent Application No. 62/899,926 filed Sep. 13, 2019, the disclosures of which are hereby incorporated by reference in their entireties.

FIELD

The present disclosure relates generally to cranial implants and, more particularly, to cranial implants that include optical and/or acoustic lenses to provide enhanced functionality.

BACKGROUND

Surgical access to the intracranial space frequently involves a craniectomy or a craniotomy. To perform a craniectomy, for example, a series of burr holes or key holes are typically created in the skull. Following surgery, these burr holes may be repaired with a variety of biocompatible materials, such as autologous bone, mineralized collagen, titanium alloys, polyethylene, polymethyl methacrylate (PMMA), polyetheretherketone (PEEK), and calcium phosphate bioceramics, among others. Although custom sizes may be utilized, 14 mm is the standard diameter for burr holes used in these neurosurgical procedures. The size of burr holes generally limits their usefulness as synthetic apertures for diagnostic and therapeutic applications, including transcranial therapeutic ultrasound, diagnostic ultrasound, photoacoustic imaging, optical coherence tomography (OCT), electromagnetic wave intervention, and the like.

Thus, there remains a need for approaches that enable the use of "synthetic windows" into the intracranial space through burr holes or other cranial openings when performing such diagnostic and therapeutic applications.

SUMMARY

This application discloses a variety of cranial implant devices that include optical and/or acoustic lenses that permit and enhance a wide array of transcranial mechanical and/or electromagnetic wave-based diagnostic and/or therapeutic applications. Once implanted in subjects, the devices may remain in place for indefinite durations with minimal risk of infection. The devices have substantially anatomically-compatible shapes such that they are essentially non-detectable upon implantation in subjects. In addition to cranial implant devices, related systems and methods are also provided.

In one aspect, this disclosure provides a cranial implant device that includes at least one acoustic, optical, and/or photoacoustic lens element comprising one or more electromagnetically translucent, electromagnetically transparent, sonolucent, and/or acoustically active materials. The cranial implant device is structured for subgaleal scalp implantation within, beneath, and/or over at least one cranial opening of a subject. The cranial implant device also comprises a substantially anatomically-compatible shape. In addition, the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject. In some embodiments, the cranial implant device comprises a standardized form, whereas in others, the cranial implant device comprises a form that is customized for the subject. In certain embodiments, a kit comprising the cranial implant device.

In some embodiments, the cranial implant device is structured for subgaleal scalp implantation within, beneath, and/or over at least one burr hole in a skull or in at least one skull bone flap of the subject. In certain embodiments, an autologous skull bone flap comprises at least a portion of the cranial implant device. In some embodiments, an alloplastic cranial implant comprises at least a portion of the cranial implant device.

In another aspect, the present disclosure provides a system that includes at least one cranial implant device. The cranial implant device includes at least one acoustic, optical, and/or photoacoustic lens element comprising one or more electromagnetically translucent, electromagnetically transparent, sonolucent, and/or acoustically active materials. The cranial implant device is structured for subgaleal implantation within, beneath, and/or over at least one cranial opening of a subject. The cranial implant device also comprises a substantially anatomically-compatible shape. In addition, the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the at least one cranial implant device is subgalealy implanted within, beneath, and/or over the at least one cranial opening of the subject. The system also includes at least one transmission and/or receiver device configured to transmit and/or receive one or more mechanical and/or electromagnetic waves. In addition, the system also includes at least one controller operably connected to the transmission and/or receiver device. The controller comprises, or is capable of accessing, computer readable media comprising non-transitory computer-executable instructions which, when executed by at least one electronic processor, cause the transmission and/or receiver device to transmit and/or receive the one or more mechanical and/or electromagnetic waves through the at least one acoustic, optical, and/or photoacoustic lens element of the at least one cranial implant device when the at least one cranial implant device is subgalealy implanted within, beneath, and/or over at least one cranial opening of a subject and when the at least one transmission and/or receiver device is positioned in communication with the at least one cranial implant device. In some embodiments, the cranial implant device comprises a standardized form, whereas in others, the cranial implant device comprises a form that is customized for the subject.

In some embodiments, the system further comprises at least one adjustable or fixed external lens element configured to further focus the mechanical and/or electromagnetic waves transmitted through the at least one acoustic, optical, and/or photoacoustic lens element when the at least one adjustable or fixed external lens element is positioned in communication with the at least one cranial implant device and the at least one transmission and/or receiver device. In certain embodiments, the at least one transmission and/or receiver device comprises at least one sensing mechanism configured to store, analyze, and/or modify echo signals transmitted through the at least one acoustic, optical, and/or photoacoustic lens element in a time domain. In some embodiments, the at least one transmission and/or receiver device comprises at least one sensing mechanism configured to store, analyze, and/or modify echo signals transmitted through the at least one acoustic, optical, and/or photoacoustic lens element in a frequency domain.

In certain embodiments, the at least one transmission and/or receiver device comprises at least one ultrasound transducer that is configured to send and receive ultrasound waves transmitted through the at least one acoustic, optical, and/or photoacoustic lens element. In some of these embodiments, the at least one ultrasound transducer comprises at least one cross-sectional shape that comprises at least one concave, convex, and/or flat portion. In certain of these embodiments, the non-transitory computer-executable instructions which, when executed by the at least one electronic processor, cause the at least one ultrasound transducer to implement an imaging sequence and/or an imaging technique. In some embodiments, the imaging sequence and/or the imaging technique comprises one or more selectable parameters of the at least one ultrasound transducer that are selected from the group consisting of: a number of elements, a center frequency, a speed of sound, a wave length, an array pitch, a sampling frequency, and an emission pulse. In certain embodiments, the imaging sequence and/or the imaging technique comprises reassembling and/or normalizing ultrasound images transmitted through the at least one acoustic, optical, and/or photoacoustic lens element in substantially real-time.

In another aspect, the present disclosure provides a method of obtaining diagnostic information from, and/or administering therapy to, a subject. The method includes implanting at least one cranial implant device subgalealy within, beneath, and/or over at least one cranial opening of the subject. The cranial implant device comprises at least one acoustic, optical, and/or photoacoustic lens element comprising one or more electromagnetically translucent, electromagnetically transparent, sonolucent, and/or acoustically active materials. The method also includes transmitting and/or receiving one or more mechanical and/or electromagnetic waves through the at least one acoustic, optical, and/or photoacoustic lens element of the at least one cranial implant device into and/or from intracranial matter of the subject using at least one transmission and/or receiver device, thereby obtaining the diagnostic information from, and/or administering the therapy to, the subject.

In certain embodiments, the method includes implanting the at least one cranial implant device subgalealy within, beneath, and/or over the at least one cranial opening of the subject during a craniectomy, cranioplasty, craniotomy, or minimally invasive surgery on the subject. In some embodiments, the method includes affixing the at least one cranial implant device to a skull of the subject using one or more screws and/or one or more chemical bonding agents. In certain embodiments, the method includes transmitting and/or receiving the one or more mechanical and/or electromagnetic waves through the at least one acoustic, optical, and/or photoacoustic lens element of the at least one cranial implant device into and/or from the intracranial matter of the subject as part of performing an ultrasound, photoacoustic imaging, photothermal, acousto-thermal, acoustic thermometry, acoustic microscopy, and/or optical coherence tomography (OCT) process. In some embodiments, the method further includes positioning at least one cover over the at least one cranial opening of the subject when the cranial implant device is subgalealy implanted within, beneath, and/or over the at least one cranial opening of the subject, which cover is structured as an acoustic lens.

In some embodiments, the methods include implanting the at least one cranial implant device subgalealy within, beneath, and/or over at least one burr hole, wherein a skull flap of the subject comprises at least a portion of the at least one burr hole. In some of these embodiments, the skull flap of the subject comprises an autologous cranial bone flap or an alloplastic cranial implant. In certain embodiments, the methods include transmitting and/or receiving the one or more mechanical and/or electromagnetic waves through the at least one acoustic, optical, and/or photoacoustic lens element of the at least one cranial implant device into and/or from the intracranial matter of the subject as part of performing a pathology detection, neuromodulation, blood-brain barrier disruption, traumatic brain injury assessment and/or tissue or lesion ablation process. In certain of these embodiments, the pathology detection process comprises detecting a hematoma, brain edema, tumor presence, tumor recurrence, cerebral blood flow, ventricular size, and/or midline shift in the subject.

The lens elements of in the cranial implant devices disclosed herein include various embodiments. In some embodiments, for example, the acoustic, optical, and/or photoacoustic lens element comprises one or more diverging and/or converging lenses. In certain embodiments, the acoustic, optical, and/or photoacoustic lens element comprises a plano-convex lens, a biconvex lens, a plano-concave lens, a biconcave lens, a positive meniscus lens, a negative meniscus lens, a converging Fresnel lens, a diverging Fresnel lens, and/or and the like. In certain embodiments, the acoustic, optical, and/or photoacoustic lens element comprises a curved or rectilinear cross-sectional shape. In some embodiments, the acoustic, optical, and/or photoacoustic lens element is structured to extend into an epidural space and/or beneath a scalp of the subject when the cranial implant device is subgalealy implanted within, beneath, and/or over the at least one cranial opening of the subject.

In certain embodiments, a position of the acoustic, optical, and/or photoacoustic lens element in the cranial implant device is adjustable. In some embodiments, the cranial implant device comprises one or more transparent, sonolucent, and/or acoustically inert materials disposed at least proximal to a first and/or a second side of the acoustic, optical, and/or photoacoustic lens element. In some embodiments, the cranial implant devices include 2, 3, 4, 5, 6, 7, 8, 9, 10 or more acoustic, optical, and/or photoacoustic lens elements. In certain embodiments, the acoustic, optical, and/or photoacoustic lens element comprises polymethylmethacrylate (PMMA), room-temperature-vulcanizing (RTV) silicone, polydimethylsiloxane (PDMS), epoxy, polyetheretherketone (PEEK), and/or metamaterials. In some embodiments, the acoustic, optical, and/or photoacoustic lens element comprises one or more acoustic metamaterials and/or one or more phononic crystals.

In some embodiments, the acoustic, optical, and/or photoacoustic lens element comprises a three-dimensional structure configured to reduce a speed of sound transmitted through the acoustic, optical, and/or photoacoustic lens element. In certain embodiments, the acoustic, optical, and/or photoacoustic lens element comprises one or more waveguides. In some embodiments, the acoustic, optical, and/or photoacoustic lens element comprises at least one metamaterial having a negative refractive index and at least one other material having a subwavelength microstructure. In certain embodiments, the acoustic, optical, and/or photoacoustic lens element comprises at least one material that is modified to increase or decrease a speed of sound or a speed of light transmitted through the material.

In some embodiments, the acoustic, optical, and/or photoacoustic lens element comprises at least one substantially flat diverging lens comprising at least two different materials, wherein at least a first material transmits sound at a higher speed than a tissue of the subject, and wherein at least a second material transmits sound at a lower speed than the tissue of the subject. In certain embodiments, the acoustic, optical, and/or photoacoustic lens element comprises at least one diverging compound concave lens comprising at least two different materials, wherein at least a first material transmits sound at a higher speed than at least a second material, and wherein the second material is positioned closer to a scalp of the subject than the first material when the cranial implant device is subgalealy implanted within, beneath, and/or over the at least one cranial opening of the subject. In some embodiments, the acoustic, optical, and/or photoacoustic lens element comprises at least one diverging compound convex lens comprising at least two different materials, wherein at least a first material transmits sound at a lower speed than at least a second material, and wherein the second material is positioned closer to a scalp of the subject than the first material when the cranial implant device is subgalely implanted within, beneath, and/or over the at least one cranial opening of the subject.

In certain embodiments, the acoustic, optical, and/or photoacoustic lens element comprises at least two lenses, wherein at least a first lens comprises a different ratio of focal distance to lens diameter than at least a second lens. In some embodiments, the acoustic, optical, and/or photoacoustic lens element comprises at least one diverging lens that transmits sound at a lower speed than a tissue of the subject. In some embodiments, the acoustic, optical, and/or photoacoustic lens element comprises at least one material configured to receive optic beams reflected off the intracranial matter of the subject and emit ultrasonic waves in response when the cranial implant device is subgalealy implanted within, beneath, and/or over the at least one cranial opening of the subject. In certain embodiments, the acoustic, optical, and/or photoacoustic lens element comprises at least one diverging lens that transmits sound at a lower speed than a tissue of the subject. In some of these embodiments, a thickness of the diverging lens progressively increases extending radially from a center of the diverging lens. In some embodiments, the acoustic, optical, and/or photoacoustic lens element comprises at least one diverging lens that transmits sound at a higher speed than a tissue of the subject. In certain of these embodiments, a thickness of the diverging lens progressively decreases extending radially from a center of the diverging lens.

In some embodiments, the cranial implant device further comprises at least one cover positioned over the at least one cranial opening of the subject when the cranial implant device is subgalealy implanted within, beneath, and/or over the at least one cranial opening of the subject, which cover is structured as an acoustic lens. In certain embodiments, the cranial implant device is configured to allow sound and acoustics to be used for both transmission (Tx) and reception (Rx). In certain embodiments, the cranial implant device is configured to allow sound and acoustics to be used for either transmission (Tx) or reception (Rx).

BRIEF DESCRIPTION OF THE DRAWINGS

The accompanying drawings, which are incorporated in and constitute a part of this specification, illustrate certain embodiments, and together with the written description, serve to explain certain principles of the cranial implant devices, kits, systems, and related methods disclosed herein. The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

DEFINITIONS

Figure 1A:
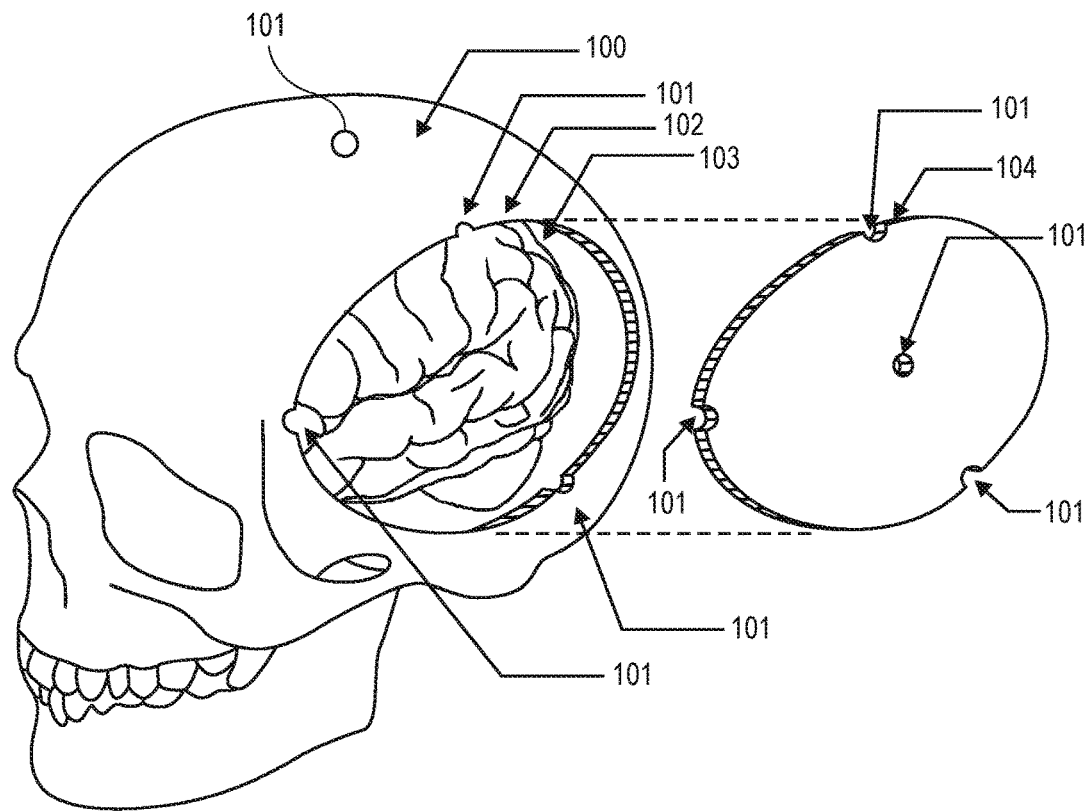
FIG. 1A schematically shows a method of implanting a left-sided, full-thickness skull resection (outlined by a cut region) into the resected portion of a skull from a perspective view according to one exemplary embodiment.

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

It is also to be understood that the terminology used herein is for the purpose of describing particular embodiments only, and is not intended to be limiting. Further, unless defined otherwise, all technical and scientific terms used herein have the same meaning as commonly understood by one of ordinary skill in the art to which this disclosure pertains. In describing and claiming the methods, cranial implant devices, and component parts, the following terminology, and grammatical variants thereof, will be used in accordance with the definitions set forth below.

About: As used herein, "about," "approximately," or "substantially" as applied to one or more values or elements of interest, refers to a value or element that is similar to a stated reference value or element. In certain embodiments, the term "about" or "approximately" refers to a range of values or elements that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value or element unless otherwise stated or otherwise evident from the context (except where such number would exceed 100% of a possible value or element).

Acoustic Lens: As used herein, "acoustic lens" refers to a configuration of one or more materials that allow the transmission of mechanical waves (e.g., sound) through those materials. In some configurations, those materials also spread and/or converge mechanical waves (e.g., sound) that are transmitted through those materials.

Alloplastic: As used herein, "alloplastic" in the context of cranial implants refers to a cranial implant that does not include material obtained or otherwise derived from a given subject into whom that implant is implanted. In some applications, alloplastic cranial implants comprise materials, such as medical grade metals (e.g., titanium, stainless steel, or the like), plastics, and non-autologous biological materials.

Autologous: As used herein, "autologous" in the context of cranial implants refers to a cranial implant that includes biological material (e.g., a skull bone flap, transplanted biological matter, etc.) obtained or otherwise derived from a given subject into whom that implant is implanted.

Burr Hole: As used herein, "burr hole" refers to a cranial opening or hole intentionally created by a healthcare provider through the skull of a subject as part of a given medical intervention. Burr-holes can have a range of diameters from about 1 mm to about 20 mm or larger (e.g., 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, and 19 mm). A standard burr-hole diameter is typically about 14 mm. The term "burr hole" is sometimes used interchangeably with the terms "keyhole" or "MacCarty keyhole."

Communication: As used herein, "communication" in the context of transmission and/or receiver devices and cranial implant devices refers to a positioning or proximity of those devices relative to one another such that the transmission and/or receiver devices is able to transmit and/or receive mechanical and/or electromagnetic waves through the cranial implant devices.

Customized: As used herein, "customized" in the context of cranial implant shapes refers to a shape that has been created at the point of fabrication specifically for an individual subject. In some embodiments, for example, custom craniofacial implants (CCIs) are designed and manufactured using computer-aided design/manufacturing (CAD/CAM) based in part on fine cut preoperative computed tomography (CT) scans and three-dimensional reconstruction (+/−stereolithographic models).

Electromagnetic Wave: As used herein, "electromagnetic wave" refers to a wave of the electromagnetic spectrum that propagates through space and carries electromagnetic radiant energy.

Mechanical Wave: As used herein, "mechanical wave" refers to a wave that is an oscillation of matter, and thus transfers energy through a medium.

Metamaterial: As used herein, "metamaterial" refers to a synthetic material having a structure engineered to exhibit one or more properties (e.g., a negative refractive index, etc.) not typically observed in naturally occurring materials.

Optical Lens: As used herein, "optical lens" refers to a configuration of one or more materials that allow the transmission of electromagnetic waves (e.g., light) through those materials. In some configurations, those materials also spread and/or converge electromagnetic waves (e.g., light) that are transmitted through those materials.

Photoacoustic Lens: As used herein, "photoacoustic lens" refers to a configuration of one or more materials that allow the transmission of mechanical waves (e.g., sound) and electromagnetic waves (e.g., light) through those materials. In some configurations, those materials also spread and/or converge mechanical waves (e.g., sound) and/or electromagnetic waves (e.g., light) that are transmitted through those materials. In certain applications, photoacoustic lenses are used for photoacoustic or optoacoustic imaging, which is a biomedical imaging technique based on the photoacoustic or optoacoustic effect in which mechanical waves are formed following the absorption of electromagnetic waves (e.g., laser light, gamma radiation, X-rays, microwaves, radio frequency waves, etc.) in a given material, such as intracranial matter or other biological tissue.

Sonolucent Material: As used herein, "sonolucent material" refers a material that permits the transmission of mechanical waves (e.g., ultrasonic waves) through the material substantially without producing echoes or other distortions (e.g., caused by the reflection of those mechanical waves).

Standardized: As used herein, "standardized" in the context of cranial implant shapes refers to a shape that has not been created at the point of fabrication specifically for any individual subject. Instead, a standardized implant shape is typically selected for ease of readily reproducible manufacture. Cranial implants having standardized shapes may also be referred to as "off the shelf" neurological implants.

Subgaleal: As used herein, "subgaleal" refers to an anatomical location substantially below the *Galea aponeurotica* of a given subject.

Subject: As used herein, "subject" refers to an animal, such as a mammalian species (e.g., human) or avian (e.g., bird) species. More specifically, a subject can be a vertebrate, e.g., a mammal such as a mouse, a primate, a simian or a human. Animals include farm animals (e.g., production cattle, dairy cattle, poultry, horses, pigs, and the like), sport animals, and companion animals (e.g., pets or support animals). A subject can be a healthy individual, an individual that has or is suspected of having a disease or a predisposition to the disease, an individual that has sustained or is suspected of having sustained a brain injury, or an individual that is in need of therapy or suspected of needing therapy. The terms "individual" or "patient" are intended to be interchangeable with "subject." For example, a subject can be an individual who has been diagnosed with having a cancer, is going to receive a cancer therapy, and/or has received at least one cancer therapy. The subject can be in remission of a cancer.

Substantially Anatomically-Compatible Shape: As used herein, "substantially anatomically-compatible shape" in the context of cranial implant devices refers to a shape such that when the device is implanted in a subject, the device is essentially visually imperceptible in the absence of, for example, analytical imaging, such as X-ray-based imaging or the like.

Translucent: As used herein, "translucent" or "semitransparent" refers to a property of a material that allows the transmission and diffusion of electromagnetic waves through the material, such that objects or matter lying beyond the material are not seen with substantial clarity.

Transparent: As used herein, "transparent" refers to a property of a material that permits the transmission of electromagnetic waves through the material without appreciable scattering, such that objects or matter lying beyond the material are seen with substantial clarity.

DETAILED DESCRIPTION

This application relates generally to skull burr holes, burr hole covers, key hole covers, craniotomies or craniectomies with implanted transparent, translucent, sonolucent, acoustically active and acoustically inert materials to create a synthetic window into the skull for diagnostic and/or therapeutic ultrasound, photoacoustic imaging, and/or optical coherence tomography (OCT), among other applications. Once implanted in subjects, the cranial implant devices disclosed herein may remain in place for indefinite durations. The devices have substantially anatomically-compatible shapes such that they are essentially visually non-detectable to the naked eye upon implantation in subjects. Further, the implantable devices described herein also typically include low-profiles (e.g., to avoid scalp-related complications and high extrusion risk leading to premature explanation). Additional details regarding cranial implant devices, aspects of which are optionally adapted for use with the devices disclosed herein, are found in, for example, International Patent Application No. PCT/US19/39519 and International Patent Publication Nos. WO 2017/039762 and WO 2018/044984, which are each incorporated by reference in their entirety.

Essentially any standardized or customized cranial implant device form is optionally utilized (e.g., circular, elliptical, square, rectangular, triangular, and the like). Additional details regarding customized and/or standardized cranial implants are provided in, for example, U.S. Provisional Patent Application No. 62/155,311, filed on Apr. 30, 2015 and entitled "A Cutting Machine For Resizing Raw Implants During Surgery", U.S. Provisional Patent Application No. 62/117,782, filed on Feb. 18, 2015 and entitled "Computer-Assisted Cranioplasty"; and International Patent Application No. PCT/US14/67656, filed on Nov. 26, 2014 and entitled "Computer-Assisted Craniomaxillofacial Surgery", the disclosures of which are each hereby incorporated by reference herein in their entirety.

Surgical access to the intracranial space typically involves a craniectomy or craniotomy. To perform a craniectomy, for example, a series of burr holes or key holes are typically created in the skull. Following surgery, these burr holes may be repaired with a variety of biological materials and/or non-biological materials.

Skull bone generally attenuates, scatters and absorbs ultrasonic waves, thereby limiting transcranial diagnostic and therapeutic ultrasound. Similarly, skull bone is visually opaque, thus limiting the ability to perform transcranial diagnostic photoacoustic imaging or therapeutic light based intervention. By placing materials that transmit acoustic and/or electromagnetic waves in burr holes, as disclosed herein, these limitations can be circumvented.

The size of burr holes previously limited their usefulness as synthetic apertures for transcranial therapeutic ultrasound, diagnostic ultrasound, photoacoustic imaging, optical coherence tomography (OCT), or electromagnetic wave intervention. The cranial implant devices and related aspects disclosed herein modify these synthetic windows, such as by changing the field of view or beam focus to enable the use of these applications previously limited by the size of these standard synthetic window apertures or burr holes.

In certain aspects, the present disclosure provides a skull hole or burr hole 'plug' or cranial implant device composed of sonolucent and/or visually translucent biocompatible materials as well a lens or lenses to allow for and enhance the ability to perform transcranial mechanical and/or electromagnetic wave-based diagnostic and therapeutic applications. Applications of post-surgical 2D, 3D, and/or 4D diagnostic ultrasound and photoacoustic imaging include immediate post-operative and long-term diagnostic examination of intracranial pathologies, including, for example, hematomas, brain edema, tumor recurrence, cerebral blood flow, ventricular size, and midline shift. Applications of therapeutic ultrasound and electromagnetic wave intervention, include, for example, lesion ablation, neuromodulation, and blood-brain disruption for targeted delivery of therapeutics, among other techniques.

In accordance with embodiments of the present disclosure, a cranial implant device, such as an implantable burr hole plug and/or cover that comprises an acoustic and/or optical lens is provided to create and augment an acoustic, optic or photoacoustic synthetic aperture in the skull. This device typically comprises a single or multiple lens elements assembled within, beneath, and/or over the skull, autologous skull implant or alloplastic skull implant. The lens element may be composed of, for example, electromagnetically translucent, electromagnetically transparent, sonolucent or acoustically active materials. Surrounding and/or between the lens elements may be transparent, sonolucent and/or acoustically inert materials. The lens elements permit and/or enhance transcranial therapeutic ultrasound, diagnostic ultrasound, photoacoustic imaging, electromagnetic wave diagnostic imaging or electromagnetic wave therapeutic intervention. These and other embodiments are described further herein.

Figure 1B:
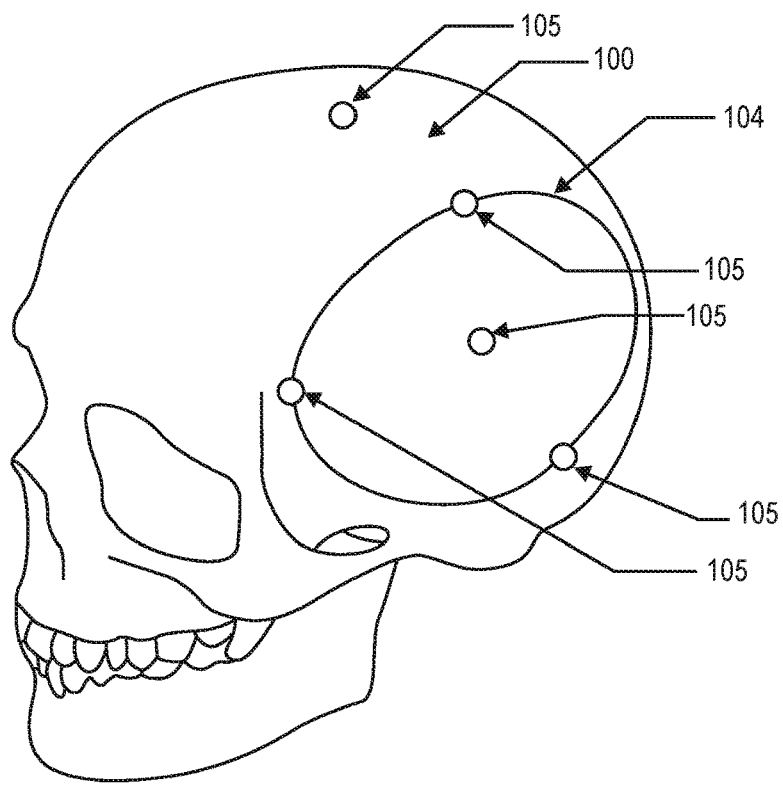
FIG. 1B schematically shows the resulting implantation of the skull flap into the resected portion of the skull of FIG. 1A along with cranial implant devices into burr holes or portions thereof in the skull flap and skull.

By way of overview, FIGS. 1A and 1B schematically show the insertion of skull bone flap 104, which includes cranial implant device 105 implanted in a burr-hole 101 disposed through skull bone flap 104. During typical cranial surgery, skull bone flap 104 is removed from skull 100 by drilling holes 101 referred to as key holes or burr holes to create craniectomy defect 102 to expose the underlying cranial contents 103. The section of removed bone is typically referred to as a skull bone flap (skull bone flap 104). Additional holes 101 may be placed in skull 100 and/or in a portion of skull 100 and skull bone flap 104. FIG. 1B shows a perspective view of skull 100 with skull bone flap 104 returned to craniectomy defect 102 in skull 100 and cranial implant devices 105 inserted into each burr or key holes 101 in this exemplary embodiment. Depending on the application, not all burr holes 101 are implanted with a cranial implant device 105. In these cases, burr holes 101 created, for example, to remove the skull bone flap 104, may then be repaired by filling them with a variety of biocompatible materials. Following surgical intervention, the craniectomy defect 102 may be filled by returning the skull bone flap 104 and secured or affixed in place using known techniques (e.g., screws, chemical bonding agents, etc.). Alternatively, the skull bone flap 104 can be replaced with an alloplastic or autologous skull implant or flap.

The cranial implant devices disclosed herein optionally include various acoustic, optical, and/or photoacoustic lens elements that include an array of electromagnetically translucent, electromagnetically transparent, sonolucent, and/or acoustically active materials depending on the intended application. Examples of such applications, include transcranial therapeutic ultrasound, transcranial diagnostic ultrasound, photoacoustic imaging, electromagnetic wave diagnostic imaging, and/or electromagnetic wave therapeutic intervention of intracranial matter of a given subject via the acoustic, optical, and/or photoacoustic lens element when the cranial implant device is subgalealy implanted within, beneath, and/or over one or more cranial openings (e.g., burr holes) of the subject. To illustrate, FIGS. 2A-2J schematically show sectional views of various cranial implant devices subgaleally implanted (proximal to scalp 301) within, beneath, and/or over a cranial opening (e.g., a burr hole) of skull 100 and above intracranial contents 103 of a subject according to exemplary embodiments. As described herein, in lieu of, or in addition to, implanting cranial implant devices in burr holes or other cranial openings, cranial implant devices are also optionally implanted in burr holes or other cranial openings disposed through skull bone flaps, autologous skull flaps or implants, and/or alloplastic skull flaps or implants. Cranial openings are typically due to a prior event (e.g., a traumatic brain injury), produced as part of surgery (e.g., craniectomy, cranioplasty, craniotomy, minimally invasive surgery, or the like), or otherwise created specifically to receive the cranial implant devices disclosed herein. Cranial implant devices are typically strategically placed to optimize therapeutic and/or diagnostic applications. Depending on the particular case, a cranial implant device may be implanted as part of an outpatient or inpatient procedure.

Figure 2C:
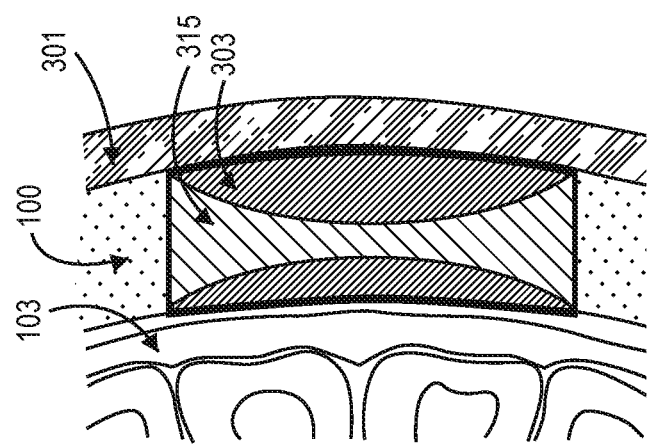
FIG. 2C schematically depicts an implanted cranial implant device comprising a biconcave lens element with other material disposed on both sides of the lens element from a sectional side view according to one exemplary embodiment.
Figure 2B:
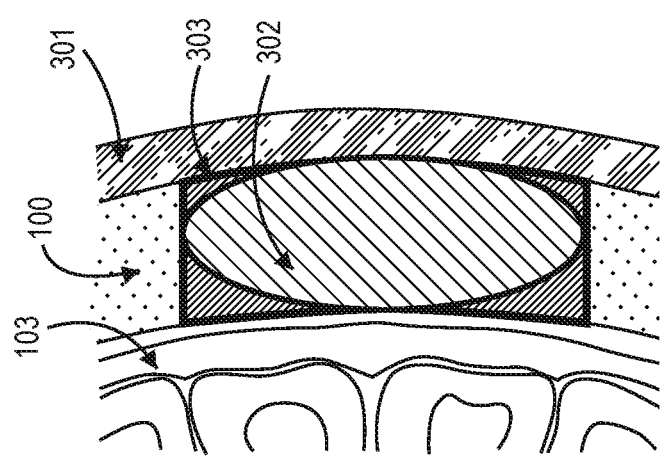
FIG. 2B schematically depicts an implanted cranial implant device comprising a biconvex lens element with other material disposed on both sides of the lens element from a sectional side view according to one exemplary embodiment.

In some embodiments, lens elements are curved (e.g., a single or double curved lens, such as a biconcave lens or a biconvex lens) or rectilinear. In certain embodiments, single or multiple lenses (e.g., single or multiple diverging and/or converging lenses) are used in the cranial implant devices disclosed herein. Optionally, a lens element is arranged to create a converging or diverging Fresnel lens. An example of such a lens element configuration is schematically depicted in FIG. 2G. In certain embodiments, lens positions can be adjusted, for example, during and/or after device implantation. In some aspects, lens elements are configured to extend into the epidural space or beneath scalp of a given subject. In some embodiments, a cover is created which rests above a given burr hole and acts as an acoustic lens. In some embodiments, the cranial implant devices and/or covers include shapes that customized to match the contours of the skull of a given subject, whereas in the embodiments, the cranial implant devices and/or covers include standardized shapes. In certain embodiments, an adjustable or fixed external lens is used for additional focusing, for example, following device implantation. An example of such an external lens is schematically depicted in FIG. 2J. In certain embodiments, a single lens element or multiple lens elements are integrated within a larger synthetic cranial implant. In some of these embodiments, the larger cranial implant acts as a lens or multiple lenses.

The cranial implants disclosed herein are fabricated from a wide array of biocompatible materials with varying acoustic and/or optic properties using any known manufacturing technique, including molding processes. These material properties typically allow for transmission of mechanical and/or electromagnetic waves through the materials. Transcranial transmission of these waves permits diagnostic and/or therapeutic applications, including, for example, pathology detection, neuromodulation, and tissue ablation. Modalities which benefit from wave transmission facilitated and enhanced by these devices include, for example, ultrasound, photoacoustic imaging, and optical coherence tomography (OCT), among many others. In addition, as described further herein, these materials may be combined or shaped to alter the transmission of mechanical and/or electromagnetic waves. Effects of altered wave transmission include, for example, increasing the area visible for diagnostic imaging or focusing waves for therapeutic intervention.

The lens elements of the cranial implant devices disclosed herein include a wide variety of properties that can be applied to particular diagnostic and/or therapeutic applications. To illustrate, lens elements are typically fabricated from materials, such as polymethylmethacrylate (PMMA), room-temperature-vulcanizing (RTV) silicone, polydimethylsiloxane (PDMS), epoxy, polyetheretherketone (PEEK), metamaterials, and/or the like. In some embodiments, lens elements are composed of metamaterials with a variety of refractive indices (including negative refractive indices), density, impedance, speed of sound, permittivity, permeability, compressibility, and/or the like. In certain of these embodiments, the use of engineered index materials are employed to achieve imaging beyond the applicable diffraction limit. In some applications, lens elements are composed of acoustic metamaterials and phononic crystals. These materials can simultaneously enhance the field-of-view and the focusing of the incident beam in certain frequencies (i.e., tuned to a certain frequency band). In some embodiments, a combination of various metamaterials and phononic crystals are used to facilitate a broader range of frequency bands.

In some embodiments, lens elements include various three-dimensional patterns/structures of the same material that are used to slow the speed of sound, similar to the effect of sound traveling through other denser materials than air. These patterns/structures form wave-guides that are used to guide waves to trajectories of interest in some embodiments. In certain embodiments, an acoustic lens element is used to accomplish a larger field-of-view by exploiting negative refractive indices, and subwavelength microstructures that are fabricated from non-metamaterials. In certain embodiments, lens elements are fabricated with materials having acoustic properties, which are modified by loading polymers with powders to increase and/or decrease the speed of sound or speed of light within the material.

In some embodiments, a diverging lens element is created using a material through which the speed of sound travels at a lower velocity than in human tissue. In these embodiments, the lens element thickness progressively increases extending radially outward from the center of the lens element. In certain embodiments, a diverging lens element is created using a material through which the speed of sound travels at a greater velocity than in human tissue. In these embodiments, the lens element is thickest at the center and progressively thins extending radially outward from the center of the lens element. In other exemplary embodiments, a flat diverging lens element is created through a combination of at least two different materials. In these embodiments, the speed of sound though these materials transmits at different velocities. One material typically has a greater speed of sound compared to through human soft tissue, while the second material has lower speed of sound compared to through human soft tissue. In some embodiments, a diverging compound concave lens element is used, which includes at least two materials in which the material disposed closest to the scalp of a given subject has a lower speed of sound relative to the material disposed further from the scalp of that subject. In other embodiments, a diverging compound convex lens element is used, which includes at least two materials in which the material disposed closest to the scalp of a given subject has a higher speed of sound relative to the material disposed further from the scalp of that subject. In some embodiments, lens elements with different ratios of focal distance to lens diameter are used. These lens elements are optionally used together or separately to vary the field of view in a given application.

Figure 2A:
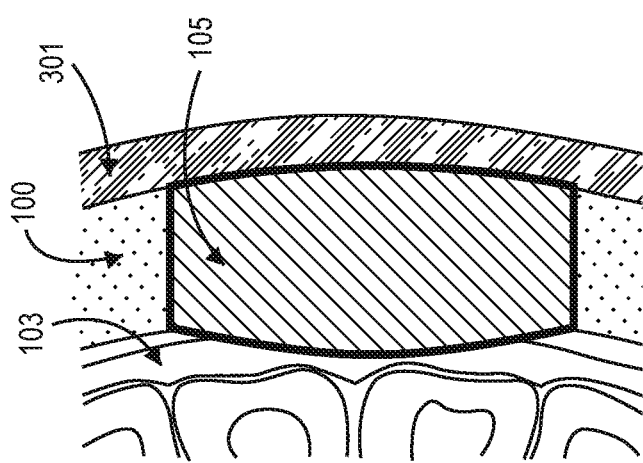
FIG. 2A schematically depicts an implanted cranial implant device comprising a biconvex lens element from a sectional side view according to one exemplary embodiment.
Figure 2F:
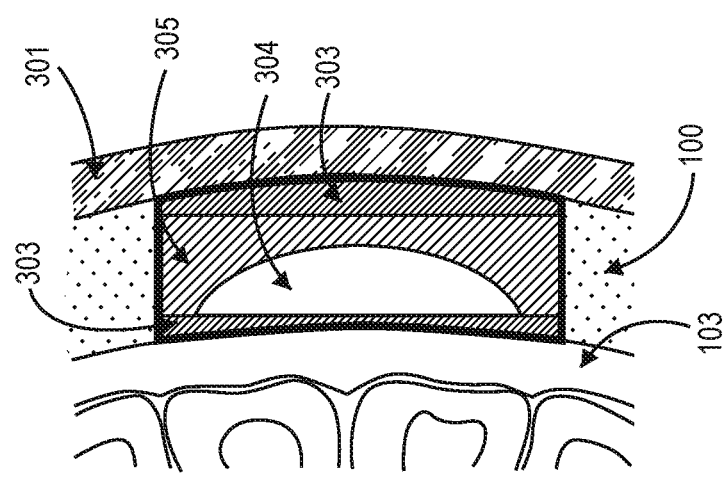
FIG. 2F schematically depicts an implanted cranial implant device comprising a convex lens element with other layers of material disposed on both sides of the lens element from a sectional side view according to one exemplary embodiment.

More specifically, FIG. 2A schematically depicts implanted cranial implant device 105 comprising a biconvex lens element from a sectional side view according to one exemplary embodiment. As with the other lens elements disclosed herein, implanted cranial implant device 105 allows for the transmission of mechanical and/or electromagnetic waves to and from the intracranial contents 103. FIG. 2B schematically depicts an implanted cranial implant device comprising a biconvex lens element 302 with other material (e.g., sonolucent and/or translucent material 303) disposed on both sides of the lens element from a sectional side view according to one exemplary embodiment. Single or multiple lens elements of different shapes and material properties may be included in the cranial implant device disclosed herein. FIG. 2C schematically depicts an implanted cranial implant device comprising a biconcave lens element 315 with other material (e.g., sonolucent and/or translucent material 303) disposed on both sides of the lens element from a sectional side view according to one exemplary embodiment. FIG. 2D schematically depicts an implanted cranial implant device comprising two biconvex lens elements (316 and 317, respectively) with another layer of material (e.g., sonolucent and/or translucent material 303) disposed between the lens element from a sectional side view according to one exemplary embodiment.

Figure 2E:
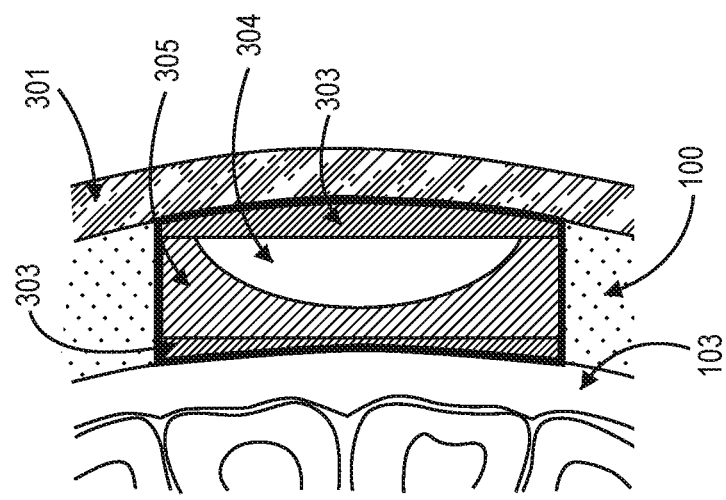
FIG. 2E schematically depicts an implanted cranial implant device comprising a convex lens element with other layers of material disposed on both sides of the lens element from a sectional side view according to one exemplary embodiment.
Figure 2D:
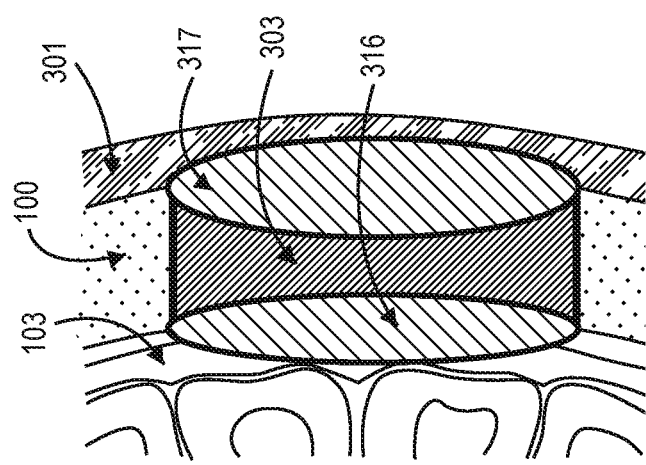
FIG. 2D schematically depicts an implanted cranial implant device comprising two biconvex lens elements with other layers of materials disposed between the lens element from a sectional side view according to one exemplary embodiment.
Figure 2I:
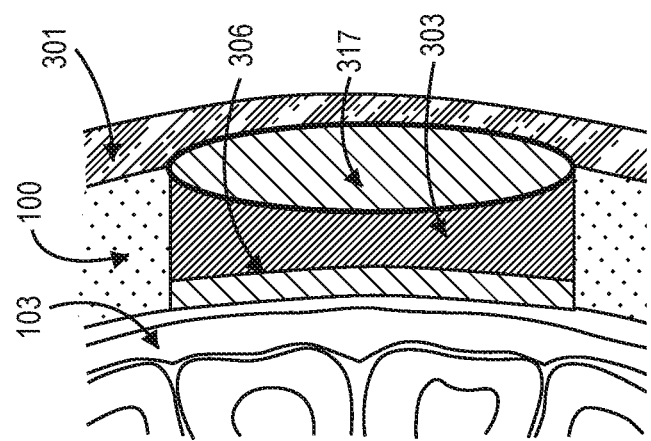
FIG. 2I schematically depicts an implanted cranial implant device comprising a biconvex lens element with other layers of material disposed on one side of the lens element from a sectional side view according to one exemplary embodiment.
Figure 2H:
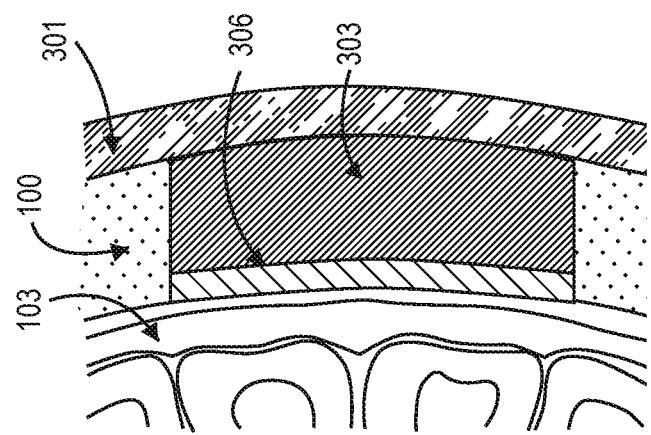
FIG. 2H schematically depicts an implanted cranial implant device comprising multiple layers of different materials from a sectional side view according to one exemplary embodiment.
Figure 2G:
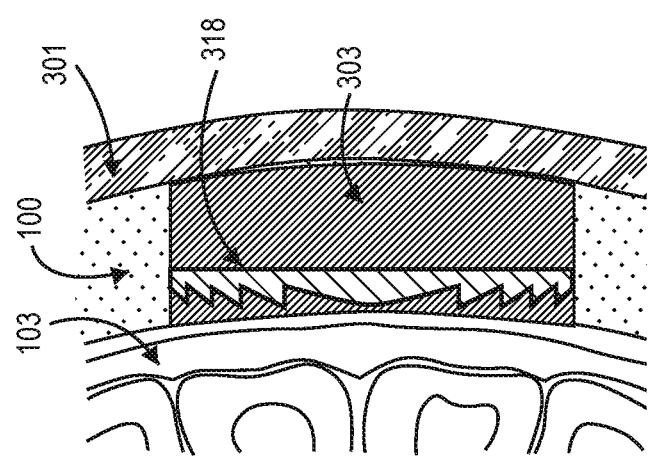
FIG. 2G schematically depicts an implanted cranial implant device comprising a Fresnel lens element with other layers of material disposed on both sides of the lens element from a sectional side view according to one exemplary embodiment.
Figure 2J:
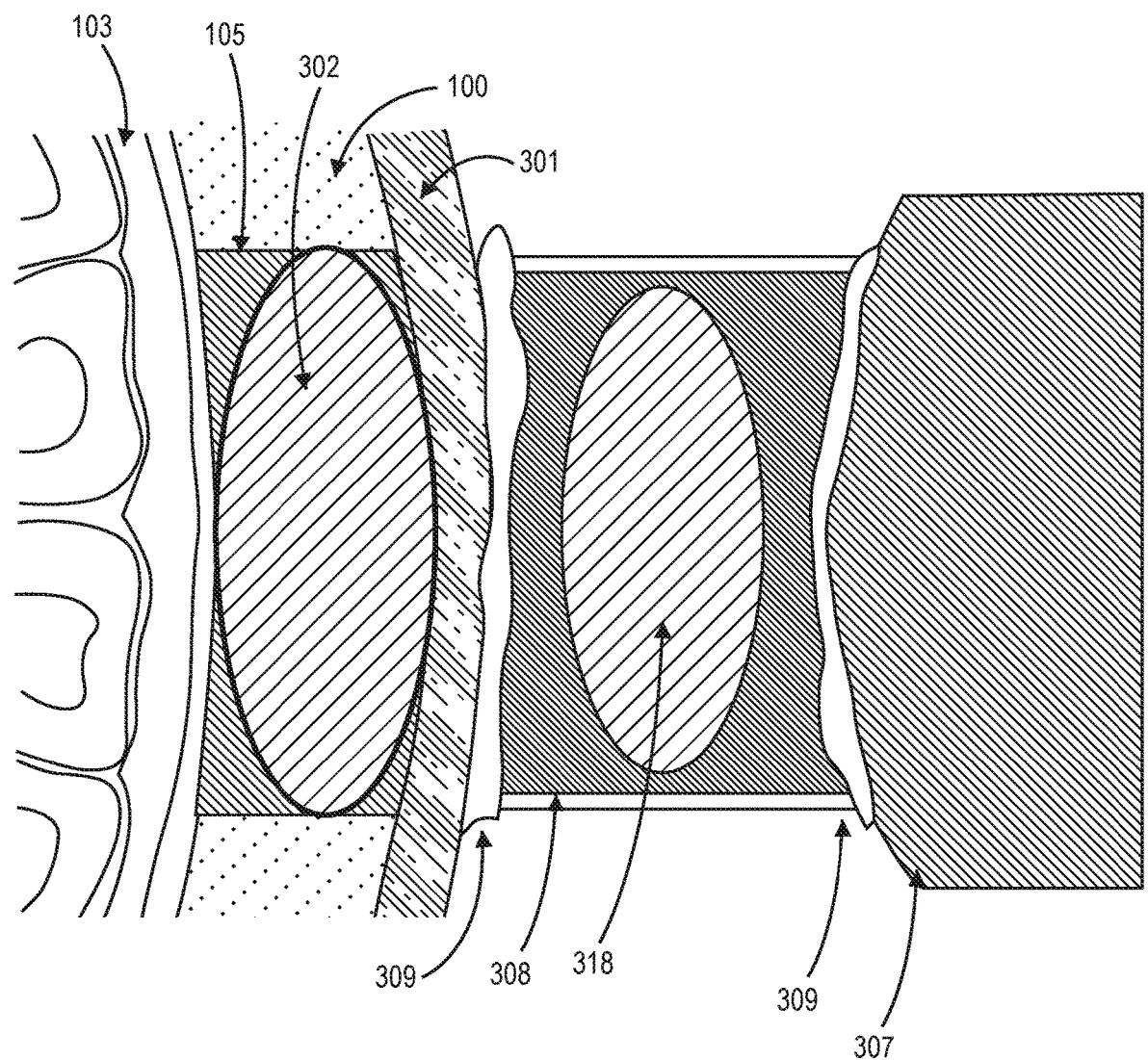
FIG. 2J schematically depicts the implanted cranial implant device from FIG. 2B with an external lens element positioned in communication with the implanted cranial implant device and a transmission and/or receiver device from a sectional side view according to one exemplary embodiment.

FIG. 2E schematically depicts an implanted cranial implant device comprising a convex lens element 304 with other layers of material (303 and 305, respectively (e.g., sonolucent and/or translucent material)) having different optic and/or acoustic properties disposed on both sides of the lens element from a sectional side view according to one exemplary embodiment. FIG. 2F schematically depicts an implanted cranial implant device comprising a convex lens 304 element with other layers of material (303 and 305, respectively (e.g., sonolucent and/or translucent material)) having different optic and/or acoustic properties disposed on both sides of the lens element from a sectional side view according to one exemplary embodiment. FIG. 2G schematically depicts an implanted cranial implant device comprising a Fresnel lens element 318 with other layers of material (e.g., sonolucent and/or translucent material 303) disposed on both sides of the lens element from a sectional side view according to one exemplary embodiment. FIG. 2H schematically depicts an implanted cranial implant device comprising multiple layers of different materials (e.g., sonolucent and/or translucent material 303, and material which receives optic waves and emits acoustic waves 306) from a sectional side view according to one exemplary embodiment. FIG. 2I schematically depicts an implanted cranial implant device comprising a biconvex lens element 317 with other layers of material (e.g., sonolucent and/or translucent material 303, and material which receives optic waves and emits acoustic waves 306) disposed on one side of the lens element from a sectional side view according to one exemplary embodiment.

FIG. 2J schematically depicts the implanted cranial implant device from FIG. 2B with an external lens element 318 positioned in communication with the implanted cranial implant device and a transmission and/or receiver device from a sectional side view according to one exemplary embodiment. In certain embodiments, this configuration is used to further improve coupling between scalp 300 and ultrasound or photoacoustic transducer 307, a stand-off or gel pad 308, and acoustic gel 309. In some embodiments, external lens element 318 is fabricated integral with stand-off 307 and is optionally adjustable in position. External lens element 318 is typically used to further alter the transmission of acoustic and electromagnetic waves.

Figure 3:
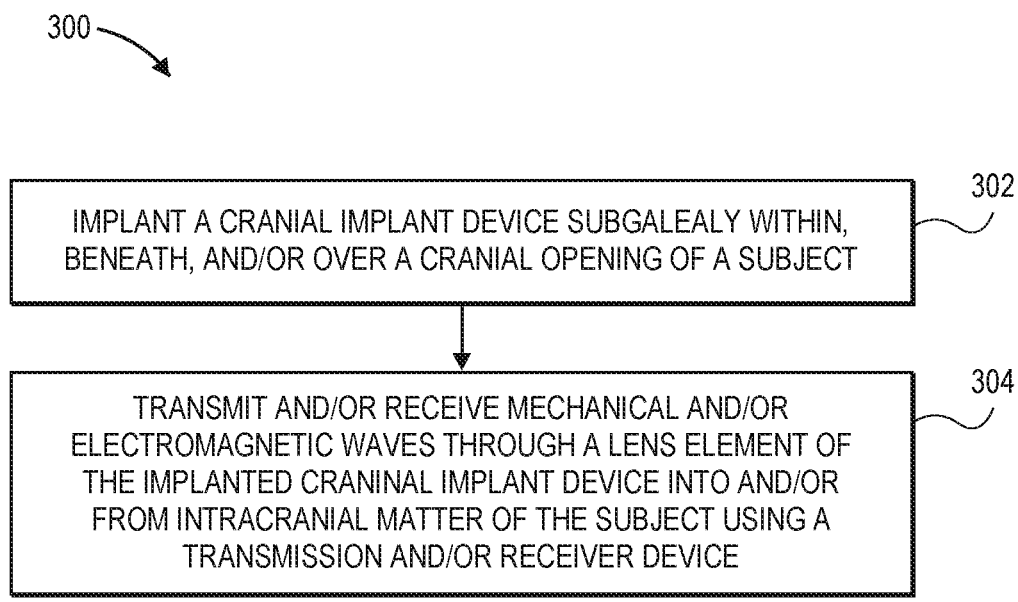
FIG. 3 is a flow chart that schematically depicts exemplary method steps of obtaining diagnostic information from, and/or administering therapy to, a subject according to one exemplary embodiment.

The present disclosure provides various methods of obtaining diagnostic information from, and/or administering therapy to, a subject using the cranial implant devices disclosed herein. To illustrate, FIG. 3 is a flow chart schematically showing such a method according to one exemplary embodiment. As shown, method 300 includes implanting a cranial implant device subgalealy within, beneath, and/or over a cranial opening (e.g., a burr hole) of the subject (e.g., during a craniectomy, cranioplasty, craniotomy, or minimally invasive surgery on the subject) in step 302. Typically, step 302 also includes affixing the cranial implant device to a skull of the subject using screws and/or chemical bonding agents. As described herein, the cranial implant device generally includes an acoustic, optical, and/or photoacoustic lens element that comprises one or more electromagnetically translucent, electromagnetically transparent, sonolucent, and/or acoustically active materials. In some embodiments, step 302 also includes positioning a cover over the cranial opening of the subject when the cranial implant device is subgalealy implanted within, beneath, and/or over the cranial opening of the subject, which cover is structured as an acoustic lens. Method 300 also includes transmitting and/or receiving mechanical and/or electromagnetic waves through the acoustic, optical, and/or photoacoustic lens element of the cranial implant device into and/or from intracranial matter of the subject using at least one transmission and/or receiver device in step 304. Method 300 is used in various diagnostic and/or therapeutic applications, including, for example, transcranial therapeutic ultrasound, transcranial diagnostic ultrasound, photoacoustic imaging, electromagnetic wave diagnostic imaging, electromagnetic wave therapeutic intervention, and/or the like of intracranial matter of the subject.

Figure 4:
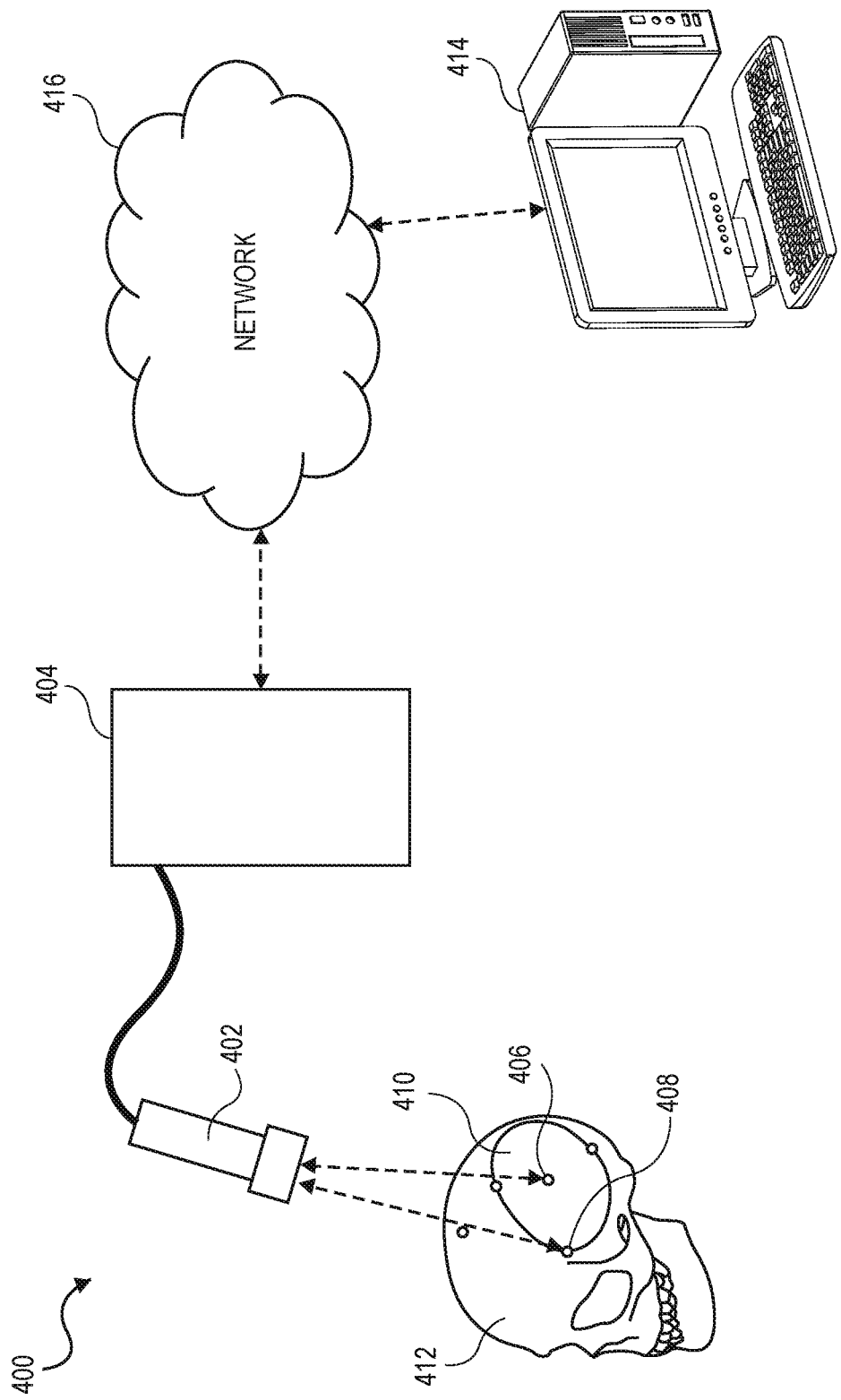
FIG. 4 schematically shows a system according to one exemplary embodiment.

The present disclosure additionally provides a variety of different systems that involve using the cranial implant devices disclosed herein. These systems typically enable, for example, acquiring real-time, non-ionizing, continuous, post-operative monitoring and long-term surveillance of the brain and/or related structures. To illustrate, FIG. 4 schematically shows system 400 according to one exemplary embodiment. As shown, system 400 includes transmission and/or receiver device 402 operably connected to controller 404. Transmission and/or receiver device 402 is configured to transmit and/or receive mechanical and/or electromagnetic waves through cranial implant devices 406 and 408 (as described herein) implanted in burr holes disposed at least partially through skull bone flap 410 of skull 412. In certain embodiments, transmission and/or receiver devices are configured to enable storage, study and modification of received echo signals in a time-domain and/or in a frequency domain. In some embodiments, transmission and/or receiver devices are configured to function as ultrasound devices, photoacoustic devices (including a laser for electromagnetic wave transmission and a receiver for mechanical wave reception), photothermal devices, acousothermal devices, acoustic thermometry devices, and/or optical coherence tomography (OCT) devices. In some embodiments, system 400 further includes acoustic microscopy functionality.

Controller 404 comprises, or is capable of accessing, computer readable media comprising non-transitory computer-executable instructions which, when executed by an electronic processor, cause transmission and/or receiver device 402 to transmit and/or receive mechanical and/or electromagnetic waves through the acoustic, optical, and/or photoacoustic lens element of cranial implant devices 406 and 408 when transmission and/or receiver device 402 is positioned in communication with cranial implant devices 406 and 408. As also shown, controller 404 is wirelessly connected with computer 414 via network 416 (as indicated by the dashed-lines between controller 404 and network 416, and between network 416 and computer 414). Optionally, controller 404 and computer 414 are operably connected to network 416 via wired connections. In other embodiments, controller 404 and computer 414 are operably connected to one another directly (i.e., not via network 416) via a wired or wireless connection, whereas in other exemplary embodiments, controller 404 comprises computer 414.

While not limited to any particular embodiment, computer 414 may be a desktop computer, notebook computer, smart phone, tablet, a virtual reality device, a mixed reality device and network 416 may be a cloud server or another format. In certain embodiments, computer 414 displays data associated with mechanical and/or electromagnetic waves sent from, and/or received by, transmission and/or receiver device 402 during the course (e.g., in substantially real-time) of a given diagnostic and/or therapeutic application.

In some embodiments, the systems disclosed herein include an ultrasound transducer that is modified to send and receive ultrasound waves transmitted through a lens element of an implanted cranial implant device. Transducers may be concave, convex, flat or a combination of geometries. Modifications may include an application specific imaging sequence or synthetic aperture imaging technique embodied in non-transitory computer readable media. Transducer parameters that are optionally varied, include number of elements, center frequency, speed of sound, wave length, array pitch, sampling frequency, emission pulse, and the like. In some embodiments, ultrasound systems include non-transitory computer readable media to reassemble, normalize, and otherwise process images transmitted through lens elements of implanted cranial implant devices (e.g., in substantially time).

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, cranial implant devices, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A cranial implant device, comprising:
at least one acoustic, optical, and/or photoacoustic lens element comprising one or more electromagnetically translucent, electromagnetically transparent, sonolucent, and/or acoustically active materials;
one or more transparent, sonolucent, and/or acoustically inert materials disposed at least proximal to a first and/or a second side of the acoustic, optical, and/or photoacoustic lens element;
wherein the cranial implant device is structured for subgaleal scalp implantation within, beneath, and/or over at least one cranial opening of a subject,
wherein the cranial implant device comprises a substantially anatomically-compatible shape, and
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject; and
at least one cover positioned over the at least one cranial opening of the subject when the cranial implant device is subgalealy implanted within, beneath, and/or over the at least one cranial opening of the subject, which cover is structured as an acoustic lens.

2. The cranial implant device of claim 1, wherein the acoustic, optical, and/or photoacoustic lens element comprises one or more wave-guides.

3. A cranial implant device, comprising:
at least one acoustic, optical, and/or photoacoustic lens element comprising one or more electromagnetically translucent, electromagnetically transparent, sonolucent, and/or acoustically active materials; and one or more transparent, sonolucent, and/or acoustically inert materials disposed at least proximal to a first and/or a second side of the acoustic, optical, and/or photoacoustic lens element,
  wherein the cranial implant device is structured for subgaleal scalp implantation within, beneath, and/or over at least one cranial opening of a subject,
  wherein the cranial implant device comprises a substantially anatomically-compatible shape,
  wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
  wherein the acoustic, optical, and/or photoacoustic lens element comprises at least one metamaterial having a negative refractive index and at least one other material having a subwavelength microstructure.

4. A cranial implant device, comprising:
at least one acoustic, optical, and/or photoacoustic lens element comprising one or more electromagnetically translucent, electromagnetically transparent, sonolucent, and/or acoustically active materials; and
one or more transparent, sonolucent, and/or acoustically inert materials disposed at least proximal to a first and/or a second side of the acoustic, optical, and/or photoacoustic lens element,
  wherein the cranial implant device is structured for subgaleal scalp implantation within, beneath, and/or over at least one cranial opening of a subject,
  wherein the cranial implant device comprises a substantially anatomically-compatible shape,
  wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
  wherein the acoustic, optical, and/or photoacoustic lens element comprises at least one substantially flat diverging lens comprising at least two different materials, wherein at least a first material transmits sound at a higher speed than a tissue of the subject, and wherein at least a second material transmits sound at a lower speed than the tissue of the subject.

5. A cranial implant device, comprising:
at least one acoustic, optical, and/or photoacoustic lens element comprising one or more electromagnetically translucent, electromagnetically transparent, sonolucent, and/or acoustically active materials; and
one or more transparent, sonolucent, and/or acoustically inert materials disposed at least proximal to a first and/or a second side of the acoustic, optical, and/or photoacoustic lens element,
  wherein the cranial implant device is structured for subgaleal scalp implantation within, beneath, and/or over at least one cranial opening of a subject,
  wherein the cranial implant device comprises a substantially anatomically-compatible shape,
  wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
  wherein the acoustic, optical, and/or photoacoustic lens element comprises at least one diverging compound concave lens comprising at least two different materials, wherein at least a first material transmits sound at a higher speed than at least a second material, and wherein the second material is positioned closer to a scalp of the subject than the first material when the cranial implant device is subgalealy implanted within, beneath, and/or over the at least one cranial opening of the subject.

6. A cranial implant device, comprising:
at least one acoustic, optical, and/or photoacoustic lens element comprising one or more electromagnetically translucent, electromagnetically transparent, sonolucent, and/or acoustically active materials; and
one or more transparent, sonolucent, and/or acoustically inert materials disposed at least proximal to a first and/or a second side of the acoustic, optical, and/or photoacoustic lens element,
  wherein the cranial implant device is structured for subgaleal scalp implantation within, beneath, and/or over at least one cranial opening of a subject,
  wherein the cranial implant device comprises a substantially anatomically-compatible shape,
  wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
  wherein the acoustic, optical, and/or photoacoustic lens element comprises at least one diverging compound convex lens comprising at least two different materials, wherein at least a first material transmits sound at a lower speed than at least a second material, and wherein the second material is positioned closer to a scalp of the subject than the first material when the cranial implant device is subgalely implanted within, beneath, and/or over the at least one cranial opening of the subject.

7. A cranial implant device, comprising:
at least one acoustic, optical, and/or photoacoustic lens element comprising one or more electromagnetically translucent, electromagnetically transparent, sonolucent, and/or acoustically active materials; and
one or more transparent, sonolucent, and/or acoustically inert materials disposed at least proximal to a first and/or a second side of the acoustic, optical, and/or photoacoustic lens element, wherein the cranial implant device is structured for subgaleal scalp implantation within, beneath, and/or over at least one cranial opening of a subject,
wherein the cranial implant device comprises a substantially anatomically-compatible shape,
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
wherein the acoustic, optical, and/or photoacoustic lens element comprises at least two lenses, wherein at least a first lens comprises a different ratio of focal distance to lens diameter than at least a second lens.

8. A cranial implant device, comprising:
at least one acoustic, optical, and/or photoacoustic lens element comprising one or more electromagnetically translucent, electromagnetically transparent, sonolucent, and/or acoustically active materials; and
one or more transparent, sonolucent, and/or acoustically inert materials disposed at least proximal to a first and/or a second side of the acoustic, optical, and/or photoacoustic lens element,
wherein the cranial implant device is structured for subgaleal scalp implantation within, beneath, and/or over at least one cranial opening of a subject,
wherein the cranial implant device comprises a substantially anatomically-compatible shape,
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
wherein the acoustic, optical, and/or photoacoustic lens element comprises at least one diverging lens that transmits sound at a lower speed or a higher speed than a tissue of the subject.

9. A cranial implant device comprising:
at least one acoustic, optical, and/or photoacoustic lens element comprising one or more electromagnetically translucent, electromagnetically transparent, sonolucent, and/or acoustically active materials; and
one or more transparent, sonolucent, and/or acoustically inert materials disposed at least proximal to a first and/or a second side of the acoustic, optical, and/or photoacoustic lens element,
wherein the cranial implant device is structured for subgaleal scalp implantation within, beneath, and/or over at least one cranial opening of a subject,
wherein the cranial implant device comprises a substantially anatomically-compatible shape,
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject, and
wherein the acoustic, optical, and/or photoacoustic lens element comprises at least one material configured to receive optic beams reflected off the intracranial matter of the subject and emit ultrasonic waves in response when the cranial implant device is subgalealy implanted within, beneath, and/or over the at least one cranial opening of the subject.

10. A cranial implant device, comprising:
at least one acoustic, optical, and/or photoacoustic lens element comprising one or more electromagnetically translucent, electromagnetically transparent, sonolucent, and/or acoustically active materials;
one or more transparent, sonolucent, and/or acoustically inert materials disposed at least proximal to a first and/or a second side of the acoustic, optical, and/or photoacoustic lens element,
wherein the cranial implant device is structured for subgaleal scalp implantation within, beneath, and/or over at least one cranial opening of a subject,
wherein the cranial implant device comprises a substantially anatomically-compatible shape, and
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject;
at least one transmission and/or receiver device configured to transmit and/or receive one or more mechanical and/or electromagnetic waves;
at least one controller operably connected to the transmission and/or receiver device, wherein the controller comprises, or is capable of accessing, computer readable media comprising non-transitory computer-executable instructions which, when executed by at least one electronic processor, cause the transmission and/or receiver device to transmit and/or receive the one or more mechanical and/or electromagnetic waves through the at least one acoustic, optical, and/or photoacoustic lens element of the at least one cranial implant device when the at least one cranial implant device is subgalealy implanted within, beneath, and/or over at least one cranial opening of a subject and when the at least one transmission and/or receiver device is positioned in communication with the at least one cranial implant device; and
at least one adjustable or fixed external lens element configured to further focus the mechanical and/or electromagnetic waves transmitted through the at least one acoustic, optical, and/or photoacoustic lens element when the at least one adjustable or fixed external lens element is positioned in communication with the at least one cranial implant device and the at least one transmission and/or receiver device.

11. A cranial implant device comprising:
at least one acoustic, optical, and/or photoacoustic lens element comprising one or more electromagnetically translucent, electromagnetically transparent, sonolucent, and/or acoustically active materials;

one or more transparent, sonolucent, and/or acoustically inert materials disposed at least proximal to a first and/or a second side of the acoustic, optical, and/or photoacoustic lens element,
wherein the cranial implant device is structured for subgaleal scalp implantation within, beneath, and/or over at least one cranial opening of a subject,
wherein the cranial implant device comprises a substantially anatomically-compatible shape, and
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject;
at least one transmission and/or receiver device configured to transmit and/or receive one or more mechanical and/or electromagnetic waves,
wherein the at least one transmission and/or receiver device comprises at least one sensing mechanism configured to store, analyze, and/or modify echo signals transmitted through the at least one acoustic, optical, and/or photoacoustic lens element in a time or a frequency domain; and
at least one controller operably connected to the transmission and/or receiver device, wherein the controller comprises, or is capable of accessing, computer readable media comprising non-transitory computer-executable instructions which, when executed by at least one electronic processor, cause the transmission and/or receiver device to transmit and/or receive the one or more mechanical and/or electromagnetic waves through the at least one acoustic, optical, and/or photoacoustic lens element of the at least one cranial implant device when the at least one cranial implant device is subgalealy implanted within, beneath, and/or over at least one cranial opening of a subject and when the at least one transmission and/or receiver device is positioned in communication with the at least one cranial implant device.

12. A cranial implant device, comprising:
at least one acoustic, optical, and/or photoacoustic lens element comprising one or more electromagnetically translucent, electromagnetically transparent, sonolucent, and/or acoustically active materials;
one or more transparent, sonolucent, and/or acoustically inert materials disposed at least proximal to a first and/or a second side of the acoustic, optical, and/or photoacoustic lens element,
wherein the cranial implant device is structured for subgaleal scalp implantation within, beneath, and/or over at least one cranial opening of a subject,
wherein the cranial implant device comprises a substantially anatomically-compatible shape, and
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject;
at least one transmission and/or receiver device configured to transmit and/or receive one or more mechanical and/or electromagnetic waves,
wherein the at least one transmission and/or receiver device comprises at least one ultrasound transducer that is configured to send and receive ultrasound waves transmitted through the at least one acoustic, optical, and/or photoacoustic lens element, and
at least one controller operably connected to the transmission and/or receiver device, wherein the controller comprises, or is capable of accessing, computer readable media comprising non-transitory computer-executable instructions which, when executed by at least one electronic processor, cause the transmission and/or receiver device to transmit and/or receive the one or more mechanical and/or electromagnetic waves through the at least one acoustic, optical, and/or photoacoustic lens element of the at least one cranial implant device when the at least one cranial implant device is subgalealy implanted within, beneath, and/or over at least one cranial opening of a subject and when the at least one transmission and/or receiver device is positioned in communication with the at least one cranial implant device.

13. A cranial implant device, comprising:
at least one acoustic, optical, and/or photoacoustic lens element comprising one or more electromagnetically translucent, electromagnetically transparent, sonolucent, and/or acoustically active materials;
one or more transparent, sonolucent, and/or acoustically inert materials disposed at least proximal to a first and/or a second side of the acoustic, optical, and/or photoacoustic lens element,
wherein the cranial implant device comprises a form that is customized for the subject,
wherein the cranial implant device is structured for subgaleal scalp implantation within, beneath, and/or over at least one cranial opening of a subject,
wherein the cranial implant device comprises a substantially anatomically-compatible shape, and
wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of a subject;
at least one transmission and/or receiver device configured to transmit and/or receive one or more mechanical and/or electromagnetic waves; and
at least one controller operably connected to the transmission and/or receiver device, wherein the controller comprises, or is capable of accessing, computer readable media comprising non-transitory computer-executable instructions which, when executed by at least one electronic processor, cause the transmission and/or receiver device to transmit and/or receive the one or more mechanical and/or electromagnetic waves through the at least one acoustic, optical, and/or photoacoustic lens element of the at least one cranial implant device when the at least one cranial implant device is subgalealy implanted within, beneath, and/or over at least one cranial opening of the subject and when the at least one transmission and/or receiver device is positioned in communication with the at least one cranial implant device.

14. A cranial implant device, comprising:
    at least one acoustic, optical, and/or photoacoustic lens element comprising one or more electromagnetically translucent, electromagnetically transparent, sonolucent, and/or acoustically active materials comprising at least one metamaterial having a negative refractive index and at least one other material having a subwavelength microstructure;
    wherein the cranial implant device is structured for subgaleal scalp implantation within, beneath, and/or over at least one cranial opening of a subject;
    wherein the cranial implant device comprises a substantially anatomically-compatible shape; and,
    wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject.

15. A cranial implant device, comprising:
    at least one acoustic, optical, and/or photoacoustic lens element comprising one or more electromagnetically translucent, electromagnetically transparent, sonolucent, and/or acoustically active materials, the at least one acoustic, optical, and/or photoacoustic lens element comprising at least one substantially flat diverging lens comprising at least two different materials, wherein at least a first material transmits sound at a higher speed than a tissue of a subject, and wherein at least a second material transmits sound at a lower speed than the tissue of the subject;
    wherein the cranial implant device is structured for subgaleal scalp implantation within, beneath, and/or over at least one cranial opening of a subject;
    wherein the cranial implant device comprises a substantially anatomically-compatible shape; and,
    wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject.

16. A cranial implant device, comprising:
    at least one acoustic, optical, and/or photoacoustic lens element comprising one or more electromagnetically translucent, electromagnetically transparent, sonolucent, and/or acoustically active materials, the at least one acoustic, optical, and/or photoacoustic lens element comprises at least one diverging compound concave lens comprising at least two different materials, wherein at least a first material transmits sound at a higher speed than at least a second material, and wherein the second material is positioned closer to a scalp of a subject than the first material when the cranial implant device is subgalealy implanted within, beneath, and/or over the at least one cranial opening of the subject;
    wherein the cranial implant device is structured for subgaleal scalp implantation within, beneath, and/or over at least one cranial opening of a subject;
    wherein the cranial implant device comprises a substantially anatomically-compatible shape; and,
    wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject.

17. A cranial implant device, comprising:
    at least one acoustic, optical, and/or photoacoustic lens element comprising one or more electromagnetically translucent, electromagnetically transparent, sonolucent, and/or acoustically active materials, the at least one acoustic, optical, and/or photoacoustic lens element at least one diverging compound convex lens comprising at least two different materials, wherein at least a first material transmits sound at a lower speed than at least a second material, and wherein the second material is positioned closer to a scalp of a subject than the first material when the cranial implant device is subgalely implanted within, beneath, and/or over the at least one cranial opening of the subject;
    wherein the cranial implant device is structured for subgaleal scalp implantation within, beneath, and/or over at least one cranial opening of a subject;
    wherein the cranial implant device comprises a substantially anatomically-compatible shape; and,
    wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject.

18. A cranial implant device, comprising:
    at least one acoustic, optical, and/or photoacoustic lens element comprising one or more electromagnetically translucent, electromagnetically transparent, sonolucent, and/or acoustically active materials, the at least one acoustic, optical, and/or photoacoustic lens element comprises at least two lenses, wherein at least a first lens comprises a different ratio of focal distance to lens diameter than at least a second lens;
    wherein the cranial implant device is structured for subgaleal scalp implantation within, beneath, and/or over at least one cranial opening of a subject;
    wherein the cranial implant device comprises a substantially anatomically-compatible shape; and,
    wherein the cranial implant device permits transcranial therapeutic ultrasound, transcranial diagnostic ultrasound, photoacoustic imaging, electromagnetic wave diagnostic imaging, and/or electromagnetic wave therapeutic intervention of intracranial matter of the subject via the acoustic, optical, and/or photoacoustic lens element when the cranial implant device is subgalealy implanted within, beneath, and/or over the at least one cranial opening of the subject.

* * * * *